(12) United States Patent
Kwatra et al.

(10) Patent No.: US 11,790,368 B2
(45) Date of Patent: Oct. 17, 2023

(54) AUTO-EVOLVING DATABASE ENDORSEMENT POLICIES

(71) Applicant: International Business Machines Corporation, Armonk, NY (US)

(72) Inventors: Shikhar Kwatra, Research Triangle Park, NC (US); Jeronimo Irazabal, Buenos Aires (AR); Edgar A. Zamora Duran, Heredia (CR); Roxana Monge Nunez, Pérez Zeledón (CR); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 16/292,507

(22) Filed: Mar. 5, 2019

(65) Prior Publication Data

US 2020/0286084 A1    Sep. 10, 2020

(51) Int. Cl.
*G06Q 20/40* (2012.01)
*G06Q 20/38* (2012.01)
*G06N 20/00* (2019.01)

(52) U.S. Cl.
CPC ....... *G06Q 20/4016* (2013.01); *G06Q 20/405* (2013.01); *G06N 20/00* (2019.01)

(58) Field of Classification Search
CPC ............. G06Q 20/4016; G06Q 20/405; G06Q 20/3823; G06Q 40/04; G06N 5/025; G06N 20/00; H04L 67/1093; H04L 63/1425; H04L 9/0637; H04L 2209/38; H04L 67/104; H04L 67/1097; H04L 9/3239; H04L 9/0643; H04L 9/3247; H04L 9/3297; H04L 2209/42; H04L 63/00; G06K 9/726; G06F 17/15; G06F 16/953; G06F 16/14; G06F 16/137; G06F 16/313; G06F 16/27;
(Continued)

(56) References Cited

U.S. PATENT DOCUMENTS

| 6,314,114 B1* | 11/2001 | Coyle | G06F 9/5044 |
| | | | 370/503 |
| 8,244,629 B2* | 8/2012 | Lewis | G06Q 20/4016 |
| | | | 705/38 |
| 9,058,607 B2* | 6/2015 | Ganti | G06Q 30/0609 |

(Continued)

FOREIGN PATENT DOCUMENTS

| CN | 108376368 A | * 8/2018 |
| CN | 108376368 A | 8/2018 |
| WO | WO-2017153495 A1 * 9/2017 | ......... G06Q 10/1053 |

OTHER PUBLICATIONS

Indranil Nath, "Data Exchange Platform to Fight Insurance Fraud on Blockchain," Dec. 1, 2016, 2016 IEEE 16th International Conference on Data Mining Workshops (ICDMW), pp. 821-825, 5 pages. (Year: 2016).*

(Continued)

*Primary Examiner* — Jacob C. Coppola

(57) ABSTRACT

An example operation may include one or more of computing historical patterns related to fraudulent attempts from a transaction log, predicting future fraud attempts from public data, correlating the historical patterns and the predicted future fraud attempts, modifying one or more endorsement policies based on the correlations, and adding the modified one or more endorsement policies to a smart contract.

20 Claims, 18 Drawing Sheets

(58) Field of Classification Search
CPC ... G06F 21/64; G06F 16/2379; G06F 16/2336
See application file for complete search history.

(56) References Cited

U.S. PATENT DOCUMENTS

| | | | |
|---|---|---|---|
| 9,690,820 B1* | 6/2017 | Girulat, Jr. | G06Q 40/06 |
| 10,171,992 B1* | 1/2019 | Viswanathan | H04M 15/50 |
| 10,388,039 B2* | 8/2019 | Calmon | G06Q 50/01 |
| 10,452,776 B2* | 10/2019 | Anderson | G06Q 50/18 |
| 10,452,998 B2* | 10/2019 | Cuomo | G06F 16/2255 |
| 10,542,015 B2* | 1/2020 | Bird | G06F 21/57 |
| 10,691,827 B2* | 6/2020 | Briscoe | G06N 3/08 |
| 10,693,643 B2 | 6/2020 | Serres et al. | |
| 2003/0026404 A1 | 2/2003 | Joyce et al. | |
| 2008/0025229 A1 | 1/2008 | Beliles et al. | |
| 2008/0114628 A1 | 5/2008 | Johnson et al. | |
| 2010/0179930 A1* | 7/2010 | Teller | G06N 20/00 706/12 |
| 2012/0158586 A1* | 6/2012 | Ganti | G06Q 20/405 705/44 |
| 2016/0004979 A1 | 1/2016 | Getchius | |
| 2016/0050205 A1* | 2/2016 | Heller | G06F 21/629 726/4 |
| 2016/0071017 A1* | 3/2016 | Adjaoute | G06Q 20/4016 706/52 |
| 2016/0283920 A1* | 9/2016 | Fisher | G06Q 20/02 |
| 2016/0342989 A1* | 11/2016 | Davis | G06Q 20/3674 |
| 2016/0342994 A1 | 11/2016 | Davis | |
| 2017/0103167 A1* | 4/2017 | Shah | G16H 10/60 |
| 2017/0214708 A1 | 7/2017 | Gukal et al. | |
| 2017/0352027 A1 | 12/2017 | Zhang et al. | |
| 2018/0189100 A1* | 7/2018 | Nemoto | G06F 9/4831 |
| 2018/0255090 A1 | 9/2018 | Kozloski et al. | |
| 2018/0285996 A1* | 10/2018 | Ma | G06F 16/2428 |
| 2019/0042736 A1 | 2/2019 | Krebs et al. | |
| 2019/0050855 A1* | 2/2019 | Martino | G06Q 20/3829 |
| 2019/0114395 A1* | 4/2019 | Lenchner | G06F 21/10 |
| 2019/0213258 A1* | 7/2019 | Bacarella | G06N 5/022 |
| 2019/0236598 A1* | 8/2019 | Padmanabhan | G06Q 20/389 |
| 2019/0305938 A1* | 10/2019 | Sandberg-Maitland | G06F 16/1824 |
| 2019/0312869 A1* | 10/2019 | Han | G06F 16/9024 |
| 2019/0379642 A1* | 12/2019 | Simons | H04L 63/0414 |
| 2019/0379699 A1* | 12/2019 | Katragadda | G06N 3/006 |
| 2020/0034353 A1 | 1/2020 | Innocenti | |
| 2020/0090188 A1* | 3/2020 | Wince | H04L 9/3239 |
| 2020/0137084 A1 | 4/2020 | Roy et al. | |
| 2020/0145191 A1* | 5/2020 | Qi | H04L 9/3247 |
| 2020/0177373 A1* | 6/2020 | Komandur | H04L 9/0816 |
| 2020/0233706 A1* | 7/2020 | Smith | G06F 9/45558 |
| 2020/0374133 A1* | 11/2020 | Liu | G06F 21/64 |
| 2020/0387503 A1* | 12/2020 | Zhang | G06F 16/2379 |
| 2022/0050897 A1 | 2/2022 | Gaddam et al. | |

OTHER PUBLICATIONS

Irazabel, et al., "Method and system for auto evolving Smart contract policies," 10 pages (previously filed in application by applicant on Mar. 5, 2019). (Year: 2018).*

Andrea M. Rozario, et al., "Auditing Smart Contracts," International Journal of Digital Accounting Research, vol. 18, pp. 1-27, 28 pages. (Year: 2018).*

D.N. Dillenberger, et al., "Blockchain analytics and artificial intelligence," Feb. 19, 2019, IBM Journal of Research and Development, vol. 63, Issue 2/3, pp. 5:1-5:14, 14 pages. (Year: 2019).*

Azam Rashid, et al., "Smart Contracts Integration between Blockchain and Internet of Things: Opportunities and Challenges," Feb. 1, 2019, 2019 2nd International Conference on Advancements in Computational Sciences (ICACS), 9 pages. (Year: 2019).*

Paula Fraga-Lamas, et al., "A Review on Blockchain Technologies for an Advanced and Cyber-Resilient Automotive Industry," Jan. 1, 2019, IEEE Access, vol. 7, pp. 17578-98, 21 pages. (Year: 2019).*

Hongzhi Li, et al., "EduRSS: A Blockchain-based Educational Records Secure Storage and Sharing Scheme," IEEE Access 7: 179273-89, 17 pages. (Year: 2019).*

Dolores Modic, et al., Innovations in intellectual property rights management: Their potential benefits and limitations, European Journal of Management and Business Economics, ISSN: 2444-8494, Apr. 9, 2019, 15 pages. (Year: 2019).*

A Blockchain Platform for the Enterprise—Hyperledger Fabric (Hyperledger) Mar. 4, 2018, [online], [retrieved on Nov. 18, 2020], Retrieved from the Internet: https://nyperledger-fabric.readthedocs.io/en/release-1.2/index.html, pp. 1-71 (Year: 2018).*

Joby, Amal, "Unsupervised Learning: How Machines Learn on Their Own," published at https://learn.g2.com/unsupervised-learning, all pages. (Year: 2021).*

Weedmark, David, "Machine Learning Model Training: What It Is and Why It's Important," published at https://www.dominodatalab.com/blog/what-is-machine-learning-model-training, all pages. (Year: 2021).*

Oden Technologies, "What Is Model Training?," published at https://oden.io/glossary/model-training/, all pages. (Year: 2022).*

Delua, Julianna, "Supervised vs. Unsupervised Learning: What's the Difference?," published at https://www.ibm.com/cloud/blog/supervised-vs-unsupervised-learning, all pages. (Year: 2021).*

IBM Cloud Education, "Unsupervised Learning: How Machines Learn on Their Own," published at https://learn.g2.com/unsupervised-learning, all pages. (Year: 2020).*

Androulaki et al., "Hyperledger Fabric: A Distributed Operating System for Permissioned Blockchains," EuroSys, Apr. 2018, ACM ISBN 978-1-4503-5584—Jan. 18, 2004, all pages. (Year: 2018).*

Baliga et al., "Performance Characterization of Hyperledger Fabric," IEEE, 2018 Crypto Valley Conference on Blockchain Technology, all pages. (Year: 2018).*

Thakkar et al., "Performance Benchmarking and Optimizing Hyperledger Fabric Blockchain Platform," arXiv: 1805.11390v1, May 2018, all pages. (Year: 2018).*

Benhamouda et al., "Supporting Private Data on Hyperledger Fabric with Secure Multiparty Computation," 2018 IEEE International Conference on Cloud Engineering (IC2E), Orlando, FL, USA, 2018, pp. 357-363, doi: 10.1109/IC2E.2018.00069. (Year: 2018).*

List of IBM Patents or Patent Applications Treated as Related, Mar. 9, 2019.

S. Kwatra et al., "Auto-Evolving Database Endorsement Policies", U.S. Appl. No. 16/292,576, filed Mar. 5, 2018.

Anonymous, A Blockchain Platform for the Enterprise—Hyperledger Fabric (Hyperledger) Mar. 4, 2018, [online], [retrieved on Nov. 18, 2020]. Retrieved from the Internet: https://hyperledger-fabric.readthedocs.io/en/release-1.2/index.html, pp. 1-64 (Year: 2018).

E. Androulaki, et al., "Hyperledger Fabric: A Distributed Operating System for Permissioned Blockchains." (Submitted on Jan. 30, 2018 (v1), last revised Apr. 17, 2018 (this version, v2))https://arxiv.org/abs/1801.10228.

Hyperledger, "Blockchain network" [Accessed Dec. 20, 2018] https://hyperledger-fabric.readthedocs.io/en/release-1.3/network/network.html.

Hyperledger, "Endorsement to Orderer." https://lists.hyperledger.org/g/fabric/message/5014. [Accessed Dec. 20, 2018].

N. Gaur et al., "Hands-on Blockchain with Hyperledger: Building decentralized applications with Hyperledger Fabric and Composer," Packt Publishing Ltd, 2018, p. 321.

Stack Overflow, "How do I create a dynamic endorsement policy (ESCC) in Hyperledger Fabric 1.2?" [Accessed Dec. 20, 2018] https://stackoverflow.com/questions/51934301/how-do-i-create-a-dynamic-endorsement-policy-escc-in-hyperledger-fabric-1-2.

Anonymous, "Method and System for Dynamically Generating 'Stake' or 'Weight' for an Endorser in a Blockchain Network." IP.com Disclosure No. IPCOM000254920D, Publication Date: Aug. 13, 2018.

Anonymous, Ethereum Solidity, "Solidity", p. 1-160, dated Mar. 2, 2018, downloaded from the Internet on Feb. 22, 2022, URL:

(56) References Cited

OTHER PUBLICATIONS https://github.com/ethereum/solidity/tree/66ee9aa2f1d5af5dbabd6699e98935261d49558c/docs (Year: 2018).

* cited by examiner

150

| 154 CRITERIA | 158 ANALYSIS | 162 ACTIONS |
|---|---|---|
| NAME OF PEOPLE/COMPANIES INVOLVED IN A TRANSACTION | IS THIS NAME INVOLVED IN ANY NEWS RELATED TO FRAUD? | IDENTIFY RISK AND UPDATE ENDORSEMENT POLICY IF NEEDED |
| TYPE OF TRANSACTION | IS THIS TYPE OF TRANSACTION INVOLVED IN ANY NEWS RELATED TO FRAUD? | IDENTIFY RISK AND UPDATE ENDORSEMENT POLICY IF NEEDED |
| INDUSTRY | IS THIS INDUSTRY INVOLVED IN FRAUD IN THESE TYPE OF TRANSACTIONS? | IDENTIFY RISK AND UPDATE ENDORSEMENT POLICY IF NEEDED |
| GEOGRAPHY | IS THERE ANY TREND OF FRAUD IN THIS GEOGRAPHY FOR THIS TRANSACTION? | IDENTIFY RISK AND UPDATE ENDORSEMENT POLICY IF NEEDED |
| TECHNOLOGY TYPE | IS THIS TECHNOLOGY TYPE BEING USED FOR FRAUD IN THIS TYPE OF TRANSACTION? | IDENTIFY RISK AND UPDATE ENDORSEMENT POLICY IF NEEDED |

AUTO-EVOLVING DATABASE ENDORSEMENT POLICIES

TECHNICAL FIELD

This application generally relates to analyzing and modifying endorsement policies in smart contracts of blockchain systems, and more particularly, to auto-evolving database endorsement policies.

BACKGROUND

A centralized database stores and maintains data in a single database (e.g., a database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage. In some cases, endorsement policies may not be aware of fraudulent activities, and continue to endorse transactions that should properly be rejected or invalidated. As such, what is needed is a solution that overcomes these drawbacks and limitations.

SUMMARY

One example embodiment provides a system that includes a blockchain network, which includes a shared ledger, a smart contract, and a blockchain node or peer. The shared ledger includes transaction logs and the smart contract includes endorsement policies. The blockchain node or peer is configured to perform one or more of compute historical patterns related to fraudulent attempts from the transaction logs, predict future fraud attempts from public data, correlate the historical patterns and the predicted future fraud attempts, modify one or more endorsement policies based on the correlations, and add the modified one or more endorsement policies to the smart contract.

Another example embodiment provides a method that includes one or more of computing historical patterns related to fraudulent attempts from a transaction log, predicting future fraud attempts from public data, correlating the historical patterns and the predicted future fraud attempts, modifying one or more endorsement policies based on the correlations, and adding the modified one or more endorsement policies to a smart contract.

A further example embodiment provides a non-transitory computer readable medium comprising instructions, that when read by a processor, cause the processor to perform one or more of computing historical patterns related to fraudulent attempts from a transaction log, predicting future fraud attempts from public data, correlating the historical patterns and the predicted future fraud attempts, modifying one or more endorsement policies based on the correlations, and adding the modified one or more endorsement policies to a smart contract.

BRIEF DESCRIPTION OF THE DRAWINGS

FIG. 1B illustrates an exemplary correlation table for developing specific actions based on criteria and analysis according to example embodiments.

DETAILED DESCRIPTION

Figure 1A:
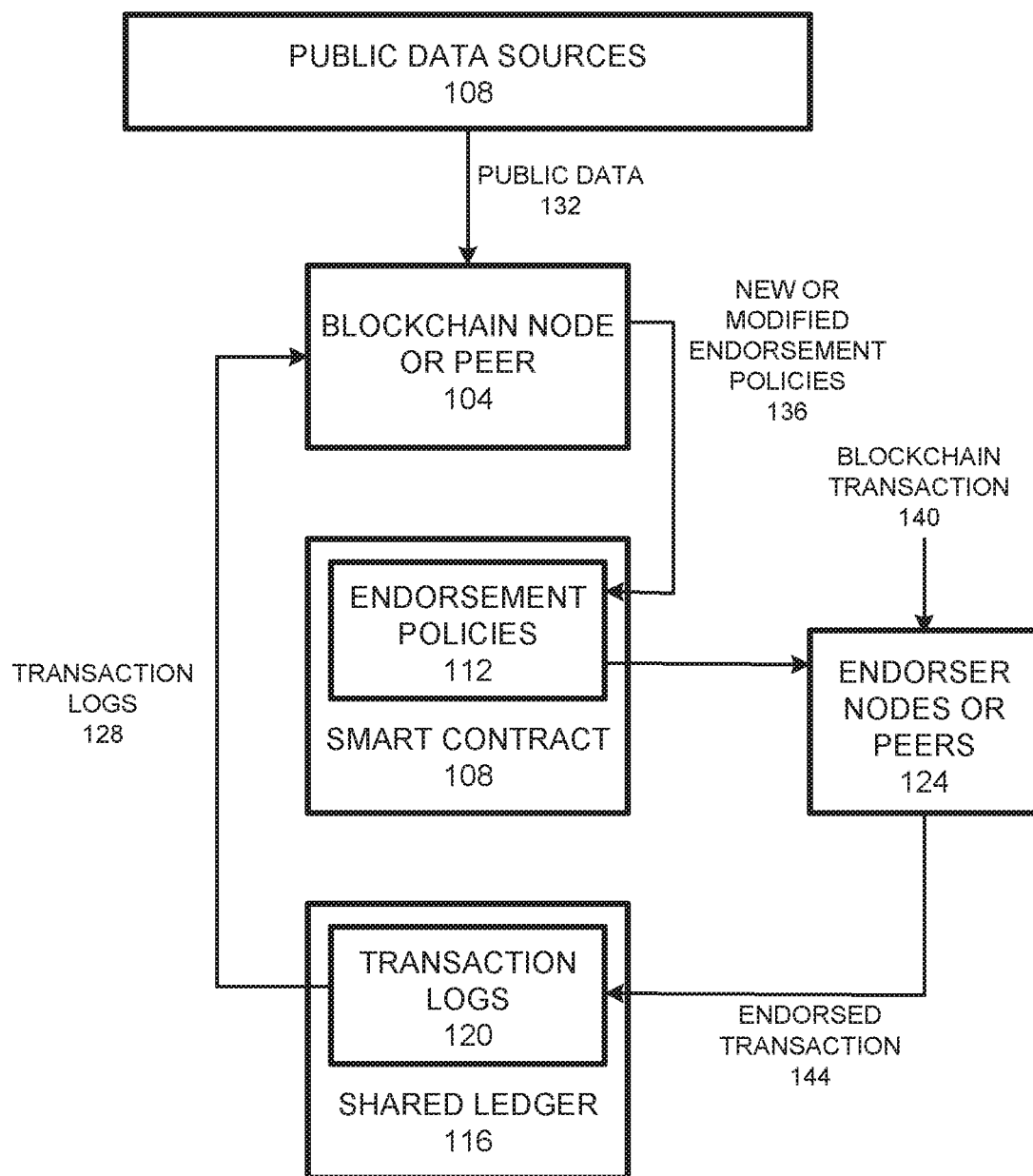
FIG. 1A illustrates a logic network diagram of a system for improving endorsement policies in a blockchain according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which provide auto-evolving database endorsement policies.

In one embodiment the application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains often involve native cryptocurrency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include endorsing policies (i.e. reliability guarantees) are not fixed but are dynamically adjusted, reliability may be improved without scalability being affected, the auto-evolved endorsement policies do not require a full smart contract upgrade, and the endorsement policies may be supplied to any platform in which transactions are generated by a subset of nodes/peers, while maintained by the broader blockchain network.

The present application describes methods and systems which provides a flexible and automated way to define endorsing requirements for blockchain transactions. Endorsing requirements become highly relevant in blockchain due to untrusted parties coming to an agreement on the result of each transaction. Peers belonging to different parties may endorse transaction results and the disclosed approach may be used to dynamically adapt such requirements based on contextual and historical information.

The present application creates a functional improvement by providing a flexible and automated way to define the endorsing requirements based on contextual and historical data. The approach not only enables the specification of endorsing policies (endorsing requirements) based on the topology of the blockchain network, smart-contract requirements, involved parties, etc., but also provides a way to auto-adjust such requirements.

Functionality to update endorsement requirements of smart contracts based on contextual and historical data will update endorsement requirements of smart contracts. Smart contracts may include additional information such as critic functionality, multi-region endorsement, etc. Such information may be stored in a shared ledger and then used as input for auto-adjustment of endorsement requirements.

Based on fraud prediction, a blockchain system generates dynamic rule-based endorsement policies to be added to an auto-evolving smart contract framework for ensuring protection against said fraudulent attempts in blockchain enabled transaction systems. Dynamic rule-based endorsement policies allow an automatic and real-time measured trigger (probably surpassing a threshold in the number or percentage of fraudulent or erratic transactions) to run procedures to evolve or modify one or more endorsing policies according to the data obtained from a trained machine learning model.

A smart contract is a computer program that directly controls the transfer of digital currencies or assets between parties under certain conditions. A smart contract not only defines the rules and penalties around an agreement in the same way that a traditional contract does, but it can also automatically enforce those obligations. Smart contracts take information as input, assign values to that input through rules set out in the contract, and executes actions required by those contractual clauses. While any smart contract is written for a transaction, there might be a chance that one or more future contextual situations or patterns are missed. Based on fraud attempts with various contextual situations, or change or evolving of new technologies, one or more smart contract rules might become invalid, or additional validation rules might be required in the smart contract. The pattern of such changes in the smart contract can be identified based on historical analysis of fraud attempts in various contextual situations. Therefore, there is an opportunity using machine learning techniques to enable the smart contract to be self-evolving based on changing needs and demands.

FIG. 1A illustrates a logic network diagram of a system for improving endorsement policies in a blockchain according to example embodiments. Referring to FIG. 1A, the system includes a blockchain network 100. The blockchain network 100 may be either a public or a permissioned blockchain network 100.

The blockchain network 100 includes one or more blockchain nodes or peers 104 and one or more endorser nodes or peers 124. Blockchain nodes or peers 104 includes logic that determines if one or more endorsement policies 112 of a smart contract or chaincode 108 should be modified in order to reduce or mitigate the possibility of fraudulent transactions. The endorser nodes or peers 124 receive blockchain transactions 140 and responsively endorse the transactions 140 using endorsement policies 112 specified in a smart contract 108. The endorsement policies 112 may include both first and second endorsement policies 112. First endorsement policies 112 allow selected or specified endorsement nodes or peers 124 to modify the write set of endorsement policies 112, while second endorsement policies 112 do not allow non-specified nodes or peers (including committer nodes or peers) to modify the write set of endorsement policies 112. As such, second endorsement policies 112 only allow non-specified nodes or peers (including committer nodes or peers) to access a read set of endorsement policies 112.

A shared ledger 116 of the blockchain network 100 stores transaction logs 120 for all committed transactions. Blockchain node or peer 104 continuously or periodically reads transaction logs 128 from the shared ledger 116, in order to establish historical patterns associated with those transaction logs 128. Blockchain node or peer 104 also receives public data 132 from one or more public data sources 108, in order to predict future fraudulent activities that may include one or more blockchain transactions 140.

Based on the historical patterns and predictions of future fraudulent activity, the blockchain node or peer 104 generates new and/or modified endorsement policies 136. The blockchain node or peer 104 generates a blockchain transaction to store the new and/or modified endorsement policies 136 to the smart contract 108. After the new and/or modified endorsement policies have been stored to the smart contract 108, they are used by endorser nodes or peers 124 to endorse new blockchain transactions 140.

The present application generates and trains a machine learning model to determine fraudulent thresholds. A significant amount of metadata may be collected for smart contracts 108 and transactions 140 in order to supply a machine learning model. This metadata has multidimensional characteristics using dimensions such as a smart contract identifier, a time/date for transactions, and counts of transactions that can be aggregated by any of the dimensions. Metadata about transactions 140 and smart contracts 108 is gathered and analyzed to feed a machine learning model that is used to identify which and how properties of an endorsing policy should be updated. The smart contract 108 defines a set of endorsers 124 via its endorsing policy. A valid transaction 140 must be endorsed 144 to fulfill what is specified in the endorsement policies 112.

The present application is able to identify that a reduced or fixed subset of endorsers 124 may be suspicious, erratic or inconvenient by using a machine learning model and triggering a process to update the endorsement policies 112. A machine learning model could also try to best select other endorsers 124. Because endorsers 124 could become compromised, forcing a change in a set of endorsers 124 may avoid committing a fraudulent transaction (i.e. a non compromised endorser 124 will disagree with other endorsers 124). All transactions 140 submitted to block generators are included in the shared ledger 116. However, before they are committed, peers 124 will validate the endorsement policy 112 and invalidation due to another transaction 140 committed that changes the state the transaction 140 being validated was generated (e.g. In Hyperledger Fabric, read-set validation). A dynamically evolving endorsement policy 112 will help to stop invalid transactions 140.

Two illustrative scenarios are presented to facilitate understanding: In a first scenario, a client may be generating an unexpected number of transactions 140 using a reduced or fixed subset of endorsers 124. The endorsement policy 112 may be adjusted to require transactions 140 from that client to be endorsed 144 by at least one endorser 124 not used before by that client. In a second scenario, transactions 140 endorsed by peers 124 at a certain location are being invalidated. The endorsement policy 112 may be adjusted to require endorsement 144 from at least one peer 124 at another location. For example, if a client is receiving transaction endorsements 144 from peers 124 located at a given host provider located in a country, the endorsement policy 112 may be adjusted to require the endorsement 144 from a peer 124 located in a different country. The location may be included in the certificate of the endorsing peer 124. The smart contract/chaincode 108 may be modified to endorse transactions 144 with a new peer 124 at a different location. The endorsement policy 112 has evolved because a pattern was dynamically detected on invalidating transactions and a trained machine learning model can detect the "reason" for the pattern is the location.

With respect to the field of quantum computing, processing power has increased rapidly. In some cases, there is a chance that encryption logic can be tracked by reverse engineering. Hence, stronger encryption logic may need to be implemented in the blockchain network 100. With respect to the introduction of "Magnetic Secure Transfer" (MTS) technology, new types of transaction systems have been introduced. Similar types of transactions may need additional validation to be introduced into the blockchain network 100.

FIG. 1B illustrates an exemplary correlation table for developing specific actions based on criteria and analysis according to example embodiments. Referring to FIG. 1B, the table 150 includes criteria 154, analysis 158, and actions 162, which are used to highlight the criteria for classification of different patterns. An expert will provide the classification of the problematic patterns and add them to the training set for the model.

Criteria 154 may include one or more of a name of people or companies involved in a transaction, a type of transaction, an industry, a geography, or a technology type. Analysis 158 may include one or more items to evaluate the criteria 154. In the case of a name of people or companies involved in a transaction 140, analysis 158 may determine if the name or company involved is in any news or public data items related to fraud. In the case of a type of transaction, analysis 158 may determine if this type of transaction is in any news or public data items 132 related to fraud. In the case of an industry, analysis 158 may determine if the industry is in any news or public data items 132 related to fraud for these types of transactions. In the case of geography, analysis 158 may determine if there is any fraud trend in the geography for this type of transaction. In the case of a technology type, analysis 158 may determine if the technology type is being used for fraud for this type of transaction.

Actions 162 may include one or more actions taken by the blockchain network 100 in the event that analysis 158 provides a positive indication. For example, for any of the criteria 154 and analysis 158, the actions 162 may include identifying a risk and updating one or more endorsement policies 112, if needed.

In one embodiment, in order to identify patterns and triggers of possible fraudulent attempt, the system may establish criteria 154 which allow a blockchain system to identify any risk accordingly. For example, the system may perform some research on newspapers for people named as the people involved in a transaction. For example, if the blockchain network 100 identifies that a person with a specific name is performing a transaction, there may be news data items that involved someone with that name with fraud. In response, the blockchain network 100 may trigger and block the transaction until a confirmation or authorization is executed for mitigating risk of fraud.

Figure 2A:
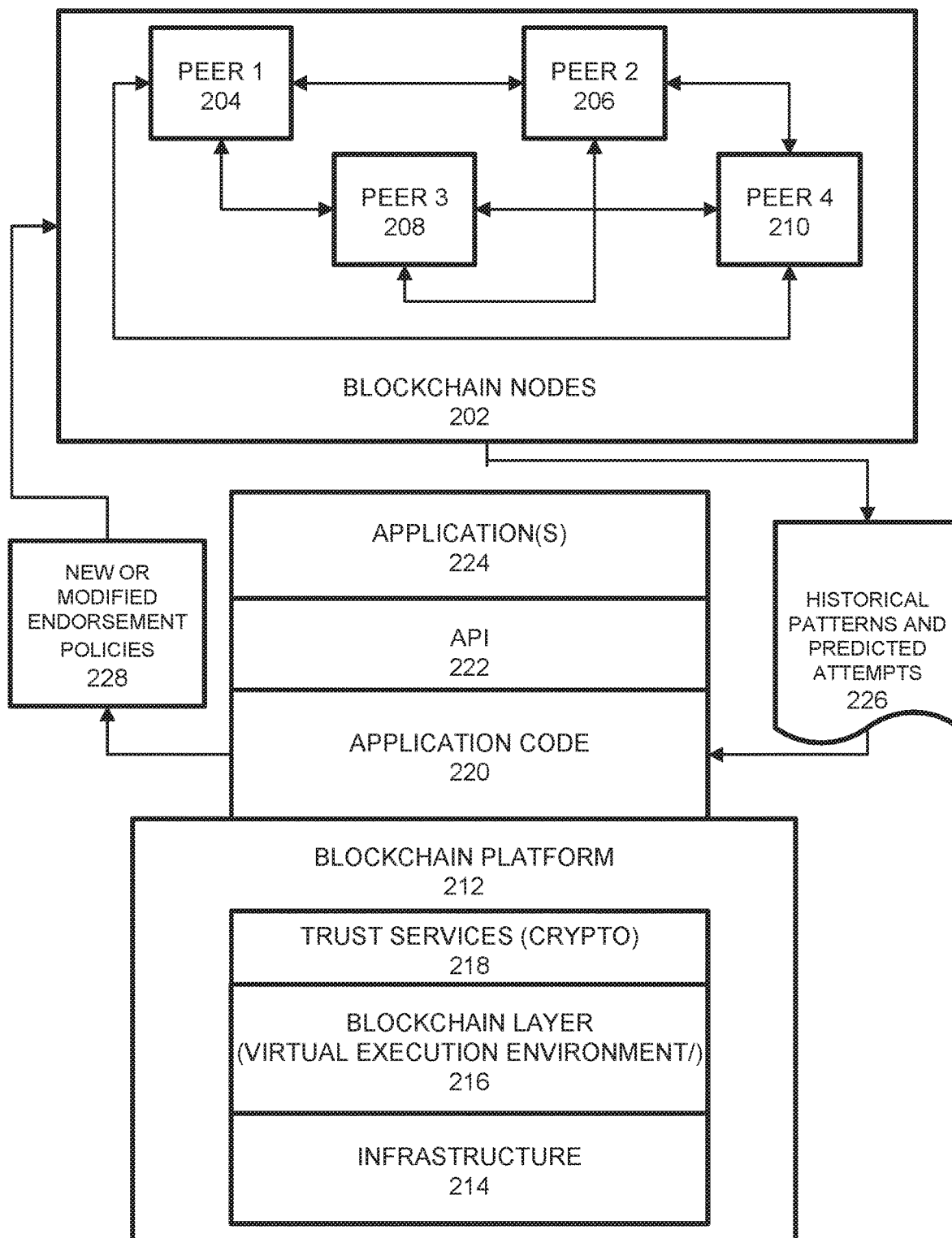
FIG. 2A illustrates an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226 may include historical patterns and predicted fraud attempts based on public data sources, and may be processed by one or more processing entities (e.g., virtual machines) included in the blockchain layer 216. The result 228 may include one or more new or modified endorsement policies. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
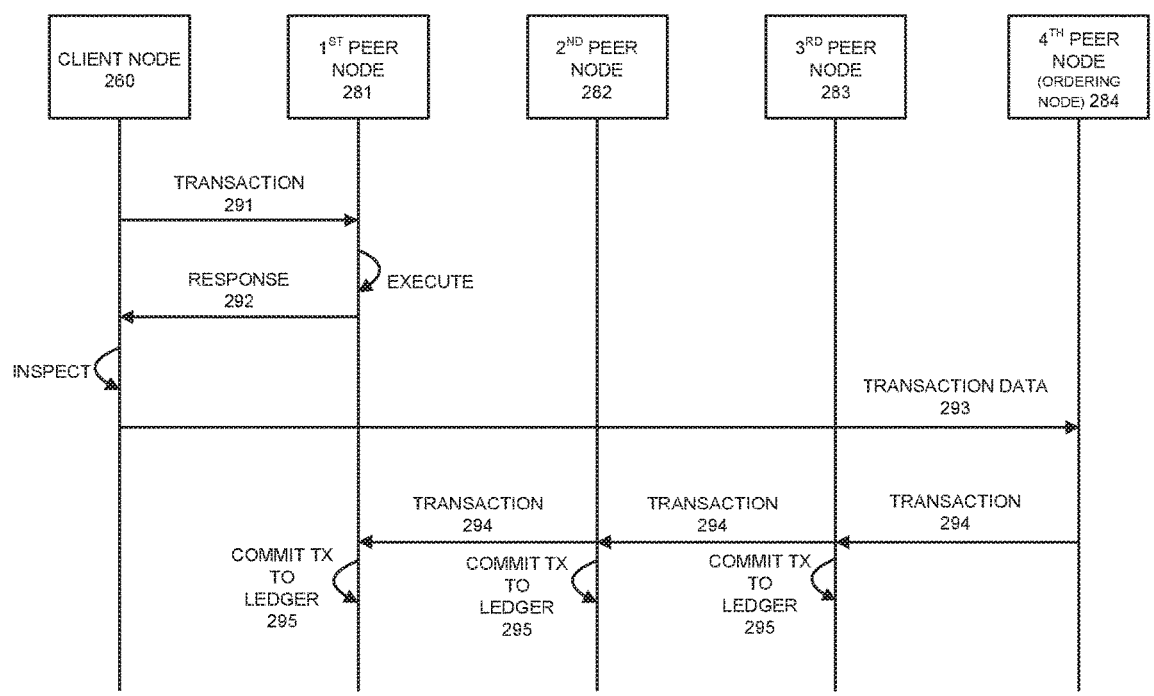
FIG. 2B illustrates a blockchain transactional flow, according to example embodiments.

FIG. 2B illustrates an example of a blockchain transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3A:
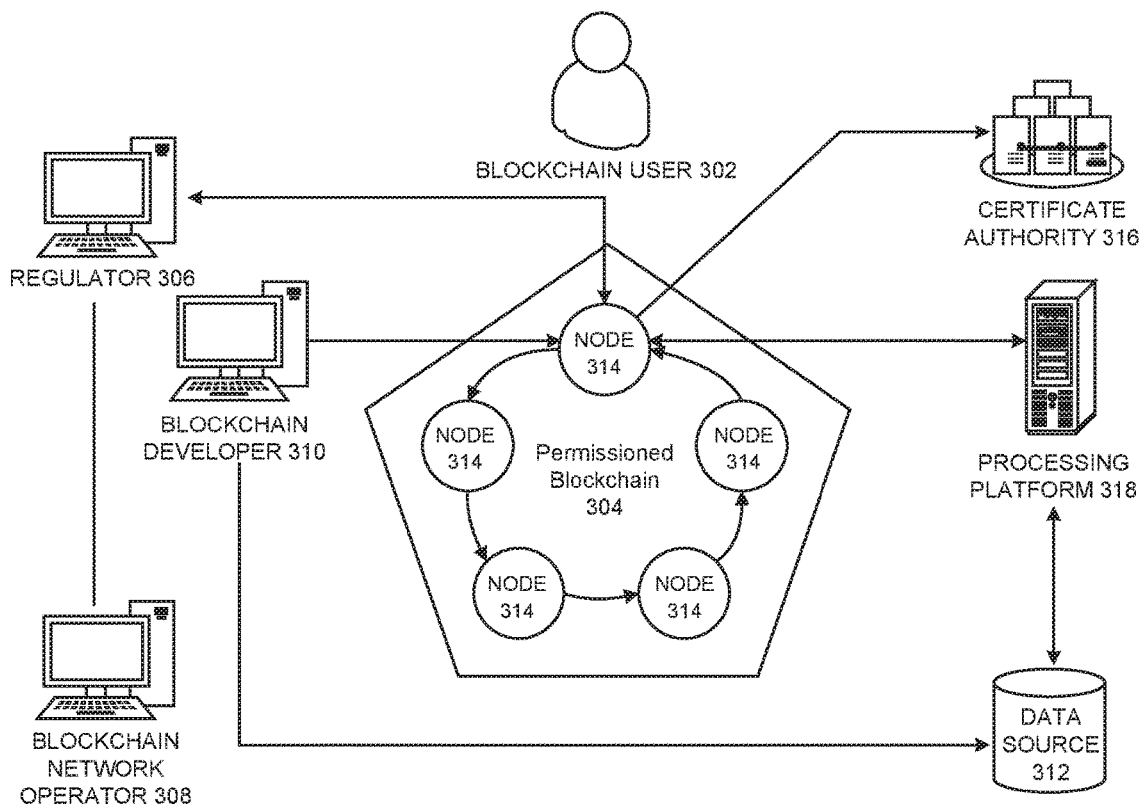
FIG. 3A illustrates a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
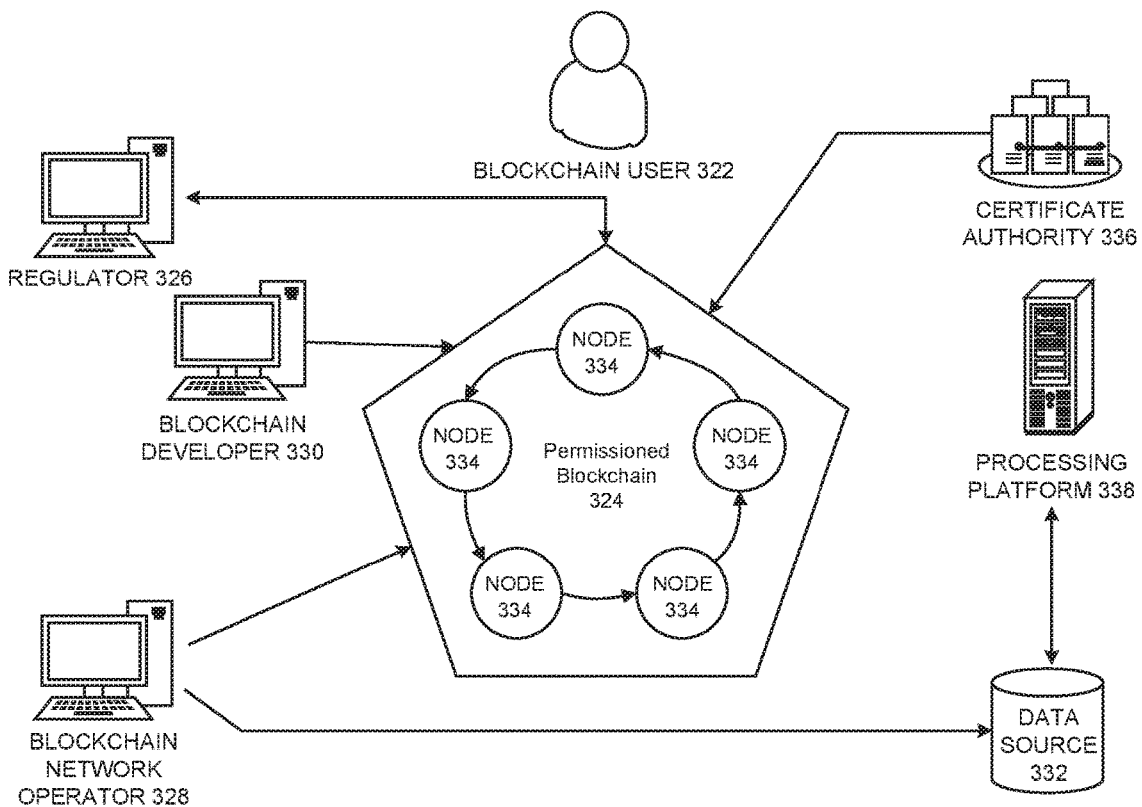
FIG. 3B illustrates another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

Figure 4:
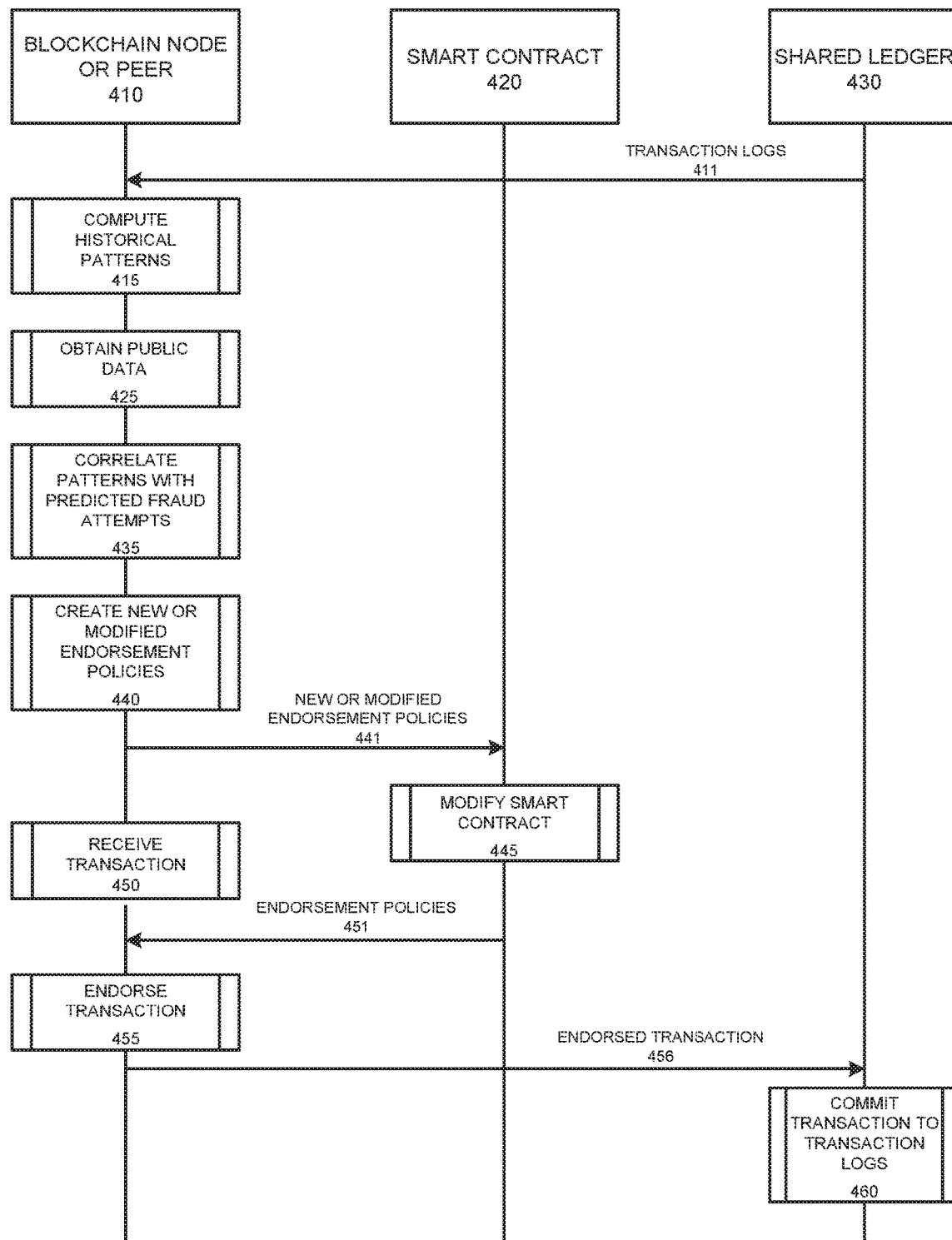
FIG. 4 illustrates a system messaging diagram for performing endorsement policy modifications in a blockchain according to example embodiments.

FIG. 4 illustrates a system messaging diagram 400 for performing endorsement policy modifications in a blockchain according to example embodiments. Referring to FIG. 4, the system diagram 400 includes a blockchain node or peer 410, a smart contract or chaincode 420, and a shared ledger 430.

The blockchain node or peer 410 retrieves transaction logs 411 from the shared ledger 430 either in real time or periodically. In response, the blockchain node or peer 410 computes historical patterns 415 from the transaction logs 411. The blockchain node or peer 410 also obtains public data 425 from one or more public databases from public data sources 108.

The blockchain node or peer 410 next correlates the historical patterns with predicted fraud attempts based on the public data 435, and creates new or modified endorsement policies 440 from the correlated data 435.

The blockchain node or peer 410 then creates a blockchain transaction to transfer the new or modified endorsement policies 441 to the smart contract or chaincode 420, and the smart contract or chaincode 420, in response, modifies an existing smart contract 445 with the new or modified endorsement policies 441.

A new transaction 450 may require endorsement policies specified in the smart contract 420. The blockchain node or peer 410, if required to endorse the transaction 450, retrieves the most current endorsement policies 451 from the smart contract 420, and endorses the transaction 455. Endorsed transactions 456 are then provided to the shared ledger 430, and the transaction is committed to transaction logs 460.

Figure 5A:
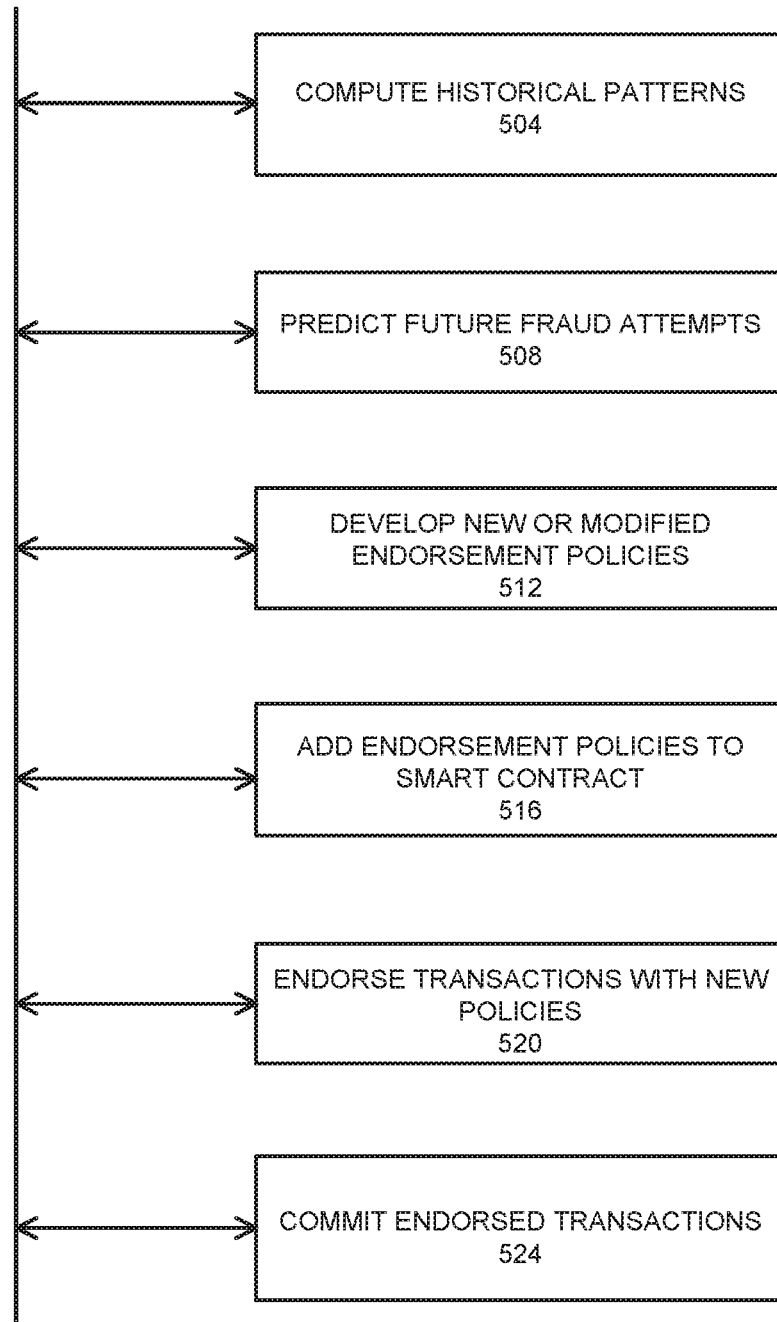
FIG. 5A illustrates an example method of modifying and utilizing revised endorsement policies in a blockchain according to example embodiments.

FIG. 5A illustrates a flow diagram 500 of an example method of modifying and utilizing revised endorsement policies in a blockchain according to example embodiments. Referring to FIG. 5A, the method 500 may include one or more of the following steps.

The system involves the use of unsupervised machine learning systems, which analyze transaction logs in order to find historical patterns of fraudulent attempts. At the same time, the system analyzes public domain data 132, which includes blogs, newspapers, technical journal etc. in order to assess various possibilities of future frauds and/or fraudulent attempts etc. Accordingly, the system will be determining if similar types of fraud can be predicted in blockchain-enabled transaction systems 100.

Based on predicted fraud attempts, or a pattern of fraudulent attempts in similar types of blockchain networks 100, the smart contract auto-evolving framework will add additional rules to a smart contract 108 in order to ensure predicted fraud attempts are protected.

The intelligent smart contract auto-evolving framework will also be analyzing any technological enhancement and will be assessing how the technological enhancement might demand a change in encryption logic. For example, if a demand of change in encryption logic requires change, then the smart contract auto-evolving framework may introduce new encryption logic.

In step 504, historical patterns are computed. Unsupervised machine learning systems may gather transaction logs from a blockchain-enabled transaction system, and accordingly may identify different types of patterns of fraud attempts in the system. The generated and trained model would determine what would be a fraudulent or problematic pattern. It may contain tabulated data such as shown in FIG. 1B that highlights criteria used for classification of different patterns. An expert may provide classification of the problematic patterns and add them to a training set for the machine learning model. For instance, at what contextual situation the fraud attempt is identified, such as an amount of a transaction, a location of a transaction, parties involved in transaction etc.

In step 508, future fraud attempts are predicted. Contextual or crowdsourced information fetched from public information sources may be stored in a knowledge database. Product literature, documents, blogs, information anomalies from other shared ledgers etc. may identify the content and context to understand new features, capabilities of transactions, and computing strength. Peers in a same blockchain network 100 could maintain such information, or an external system could while gathering information from other peers in the blockchain network 100.

Related associated activities and contents may be categorized within one objective output set with the respective information/keywords/highlights of the activity. For instance, the gathered data will be analyzed and accordingly, keywords will be identified, and will be categorized by location, contextual situation, shared ledger etc. and may be stored in the knowledge base. Multiple sets of such relationships may be created and may be stored in one or more cloud databases. A data processing engine may make use of unstructured data fetched from these sources and performs unsupervised learning, viz. K-means clustering (as one embodiment) to categorize the data—thereby aligning repetitive data and habits for accuracy and conformity.

Matching algorithms may be used to detect anomalies in the behavior of transactions or users as compared to previously known models and profiles. Techniques are also needed to eliminate false alarms, estimate risks, and predict future of current transactions or users. Neural networks that can learn suspicious patterns from samples and used later to detect them may also be used.

For business applications where blockchain-based transactions have been implemented, the system may identify what type of newly identified or predicted fraudulent attempt can occur in the system, which will be identified based on business functionalities requirements. Based on analysis of current smart contract capabilities (reverse engineering or code analysis), the system may identify if the current smart contract can protect against new types of threat or fraudulent attempts.

In step 512, new or modified endorsement policies 136 are developed. Based on defined rules and identified properties of newly identified fraud attempts, new smart contact rules are written into new or modified endorsement policies and will be added to the smart contract.

In step 516, the new or modified endorsement policies 136 are added to a smart contract or chaincode 108. Once the new smart contact logic is written, then one or more rules of the intelligent smart contract auto-evolving framework will also be updated, so that next update can be done in a proper manner. After the smart contract 108 is auto-evolved, then, any new transaction 140 will be executed by the newly evolved smart contract logic. This way, smart contracts 108 will be auto-evolving based on identified contextual scenarios and will make future transactions 140 more secure.

Smart contracts 108 encapsulate logic and state. The preferred embodiment splits the smart contract state into two disjoint portions. One of the partitions of the state (meta state) can only be modified by methods defined as meta methods. Transactions involving meta-methods are only committed by peers that execute the smart contract (aka endorsing peers 124), while committers are limited to maintain the transaction on its own copy of the shared ledger 116, but are not able to maintain their own meta-state of the chaincodes. In a preferred embodiment, the content of transactions 140 are encrypted and only endorsing peers 124 can decrypt it and process the write set of the transaction 140. The meta-state is read-only from other methods of the smart contract 108. When a smart contract 108 is deployed, two different endorsement policies 112 may be specified: one for methods that modifies meta-state (meta methods) and another for methods having read-only access to the meta-state. One of the advantages of having the notion of meta-state is avoiding the need of a smart contract 108 upgrade, which may imply a very complex process of compiling and orchestration (e.g. building docker containers, etc.). A change in the meta-state is as efficient as a normal blockchain transaction 140. Below we describe an illustrative example of a smart contract 108 making use of meta-state and business logic level state.

```
smartContract aSmartContractWithMetastate {
meta int minThreshold, maxThreshold
meta int threshold
int minMeasurement, maxMeasurement
meta method init(args [ ]int) {
minThreshold = args[0]
maxThreshold = args[1]
}
method init(args [ ]int) {
maxMeasurement = 0
minMeasurement = maxInt
}
meta method updateThreshold(newThreshold int) {
if newThreshold > minThreshold && newThreshold < maxThreshold {
threshold = newThreshold
} else {
error "Invalid new threshold"
}
}
method registerMesurement(value int) {
if value > threshold {
error "Invalid measurement"
}
if value < minMeasurement {
minMeasurement = value
}
if value > maxMeasurement {
maxMeasurement = value
}
}
}
```

It may be advantageous to split the smart contract state because a change on the meta-state of the chaincode may require a different endorsing policy e.g. a stricter policy. In the same way the smart contract 108 may be not shared with committer peers, it may be reasonable to have that possibility with the meta-state because this meta-state may affect how transactions are processed by the smart contract 108.

In step 520, one or more transactions are endorsed 144 using the new or modified endorsement policies 112.

In step 524, the endorsed transactions 144 are committed to a shared ledger 116 of the blockchain network 100.

Figure 5B:
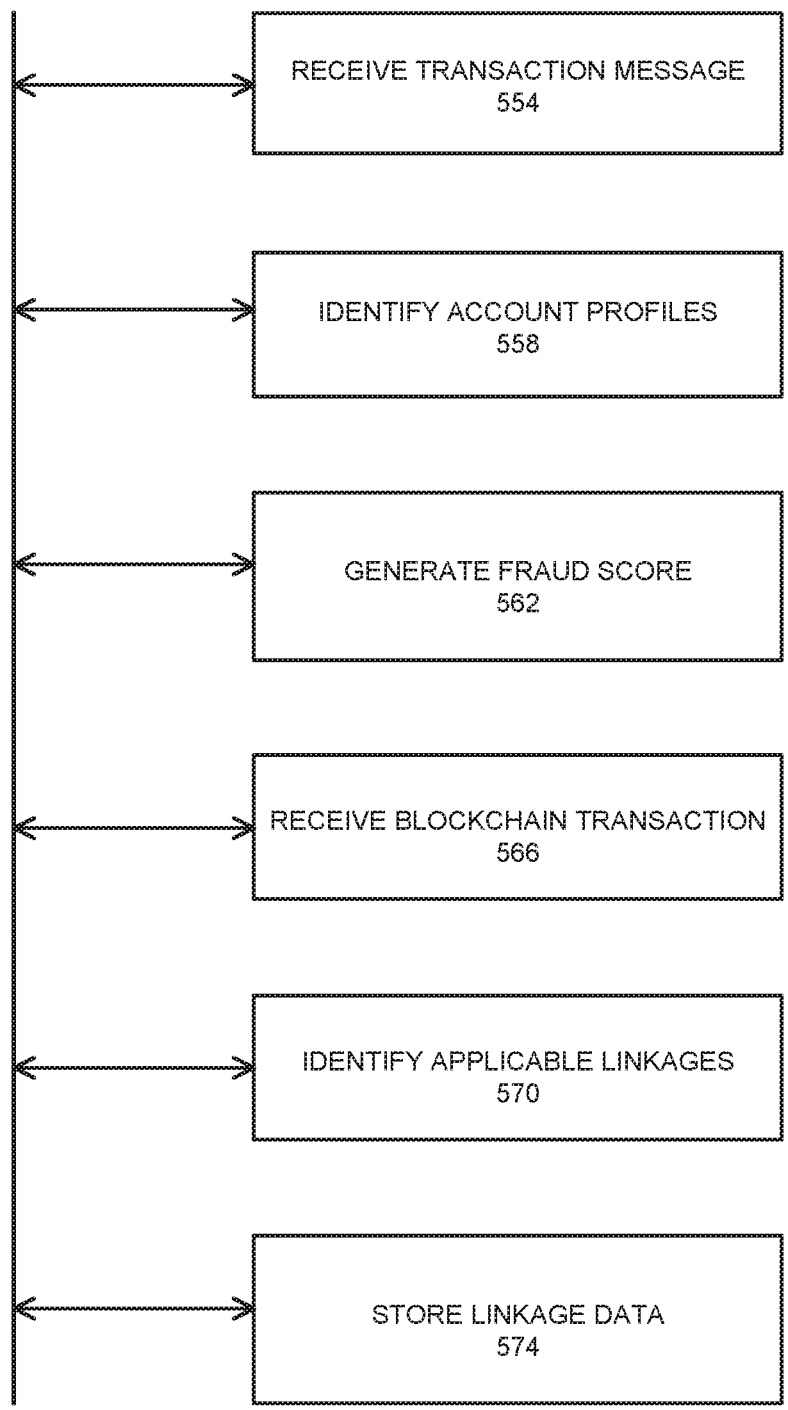
FIG. 5B illustrates an example method of linking transactions to privately verified identities in a blockchain, according to example embodiments.

FIG. 5B illustrates a flow diagram 550 of an example method of linking transactions to privately verified identities in a blockchain, according to example embodiments. Referring to FIG. 5B, the method 550 may be performed by any entity configured to receive and analyze transaction messages and receiving and verify blockchain transactions using privately and/or publicly available sources of blockchain transaction information (e.g., by analysis of the blockchain itself), such as an issuer. For example, the steps of the process 550 as performed by the components of a processing server, as discussed below, may be performed by corresponding components of an issuer in performing the process 550 by the issuer.

In step 554, a receiving unit of the processing server may receive a transaction message. The transaction message may be formatted based on one or more standards, such as the ISO 8583 standard, and may include a plurality of data elements. The data elements may include at least a first data element configured to store a personal account number, a second data element configured to store a merchant identifier, and a third data element configured to store at least a blockchain network identifier associated with a blockchain network 100. In some embodiments, the data included in each of the data elements may be included in a single data element, such as a data element reserved for private use.

In step 558, a processing unit of the processing server may identify account profiles stored in an account database that corresponds to entities involved in the associated payment transaction. For example, the processing server may identify a first account profile associated with a payer that includes an account identifier included in the first data element configured to store a personal account number, and may identify a second account profile associated with a payee that includes an account identifier included in the second data element configured to store a merchant identifier. In some instances, the account identifiers may be address identifiers, such as generated using public keys of a key pair associated with the respective entity.

In step 562, the processing unit may generate a fraud score. For instance, a fraud score may be requested by an issuer associated with the payer or an acquirer associated with the payee, such as in instances where the transaction message is received by the processing server prior to processing of the corresponding blockchain transaction. The processing unit may apply fraud rules (e.g., as stored in a memory) to data included in the received transaction message, and, in some instances, the identified account profiles, to generate a fraud score. The transmitting unit of the processing server may transmit the fraud score to the appropriate entity, such as the issuer and/or the acquirer.

In step 566, the processing unit may receive a blockchain transaction associated with the received transaction message. The transaction may either be: (1) based on the receipt of a transaction notification from the blockchain network 100 or from an entity configured to initiate the blockchain transaction (e.g., the issuer); (2) inherent to the processing server in instances where the processing server initiates the blockchain transaction; or (3) based on verification of the blockchain transaction by analysis of the blockchain itself (e.g., using the payee address, transaction amount, and other information included in the transaction message).

The receiving unit of the processing server may receive a transaction notification associated with the blockchain transaction. The transaction notification may be provided by, for example, the blockchain network 100, the issuer, the acquirer, the payer, the payee, or an entity configured to verify blockchain transactions using the blockchain, such as the payment network (e. g., using the processing unit) or a third party. The transaction notification may include at least a transaction identifier and an address identifier. The transaction identifier may be a unique value associated with the blockchain transaction. The address identifier may include an address associated with the payee. In some instances, the transaction notification may also include a payer address associated with the payer, and any additional information, such as a transaction amount. In some cases, the processing unit may identify such information from the received transaction message.

In step 570, the processing unit may identify any applicable linkages based on the information included in the received transaction notification. For instance, the processing unit may identify a linkage between the blockchain transaction and the second account profile identified in step associated with the payee of the transaction based on a correspondence with the included account and/or address identifier and the address identifier included in the received transaction notification. In instances where the transaction notification may include a payer address, the processing unit may identify a linkage between the first account profile identified in step 558 and the blockchain transaction using the payer address.

In step 574, the processing unit may store linkage data in the processing server. For example, the linkage data may be stored as a linkage between each applicable account profile and the transaction identifier in a memory, may be stored in a transaction data entry in the transaction database associated with the blockchain transaction (e.g., as account identifiers for linked account profiles), or may be stored in account profiles that are identified as linked to the transaction, such as by storage of the transaction identifier for the linked transaction in the account profile. In some instances, storage of linkage data may include transmitting, by the transmitting unit, linkage data to an external entity for storage, such as to the issuer for storage in an account profile for use in future blockchain transactions.

Figure 6A:
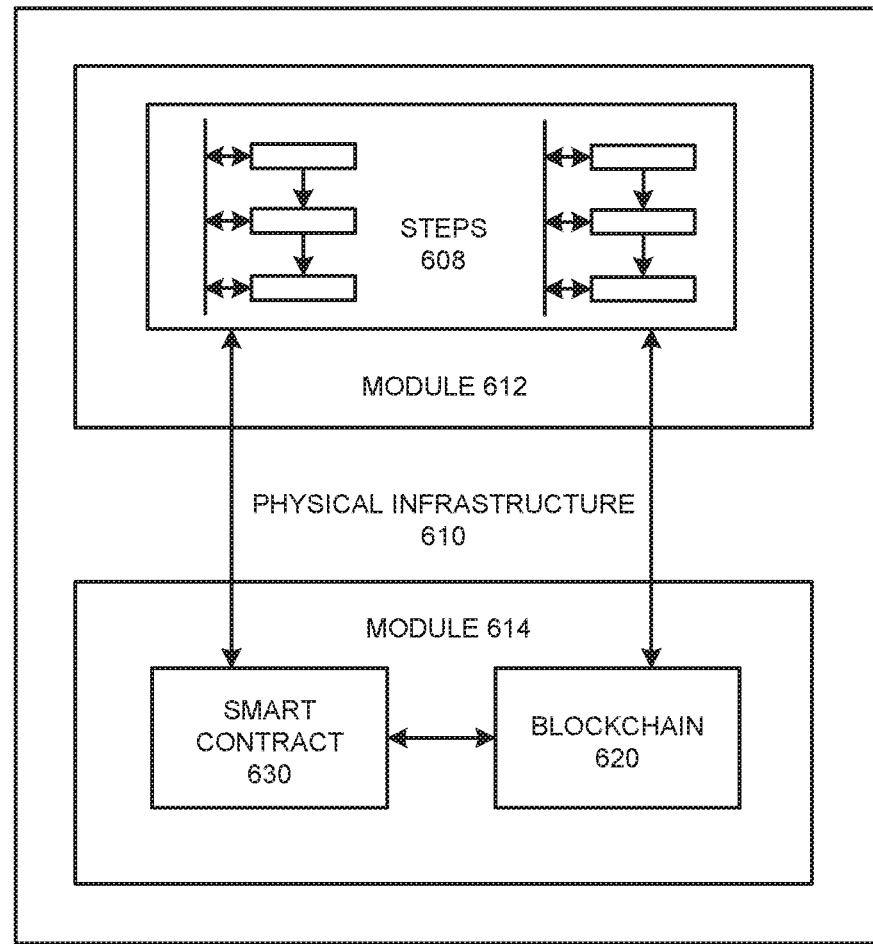
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
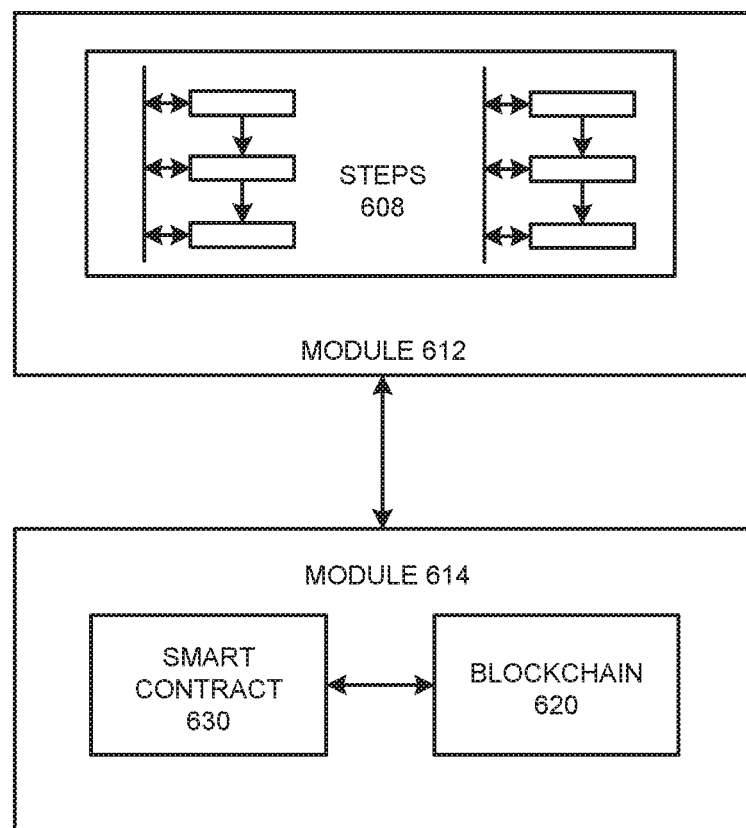
FIG. 6B illustrates another example system configured to perform one or more operations described herein, according to example embodiments.

FIG. 6B illustrates another example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
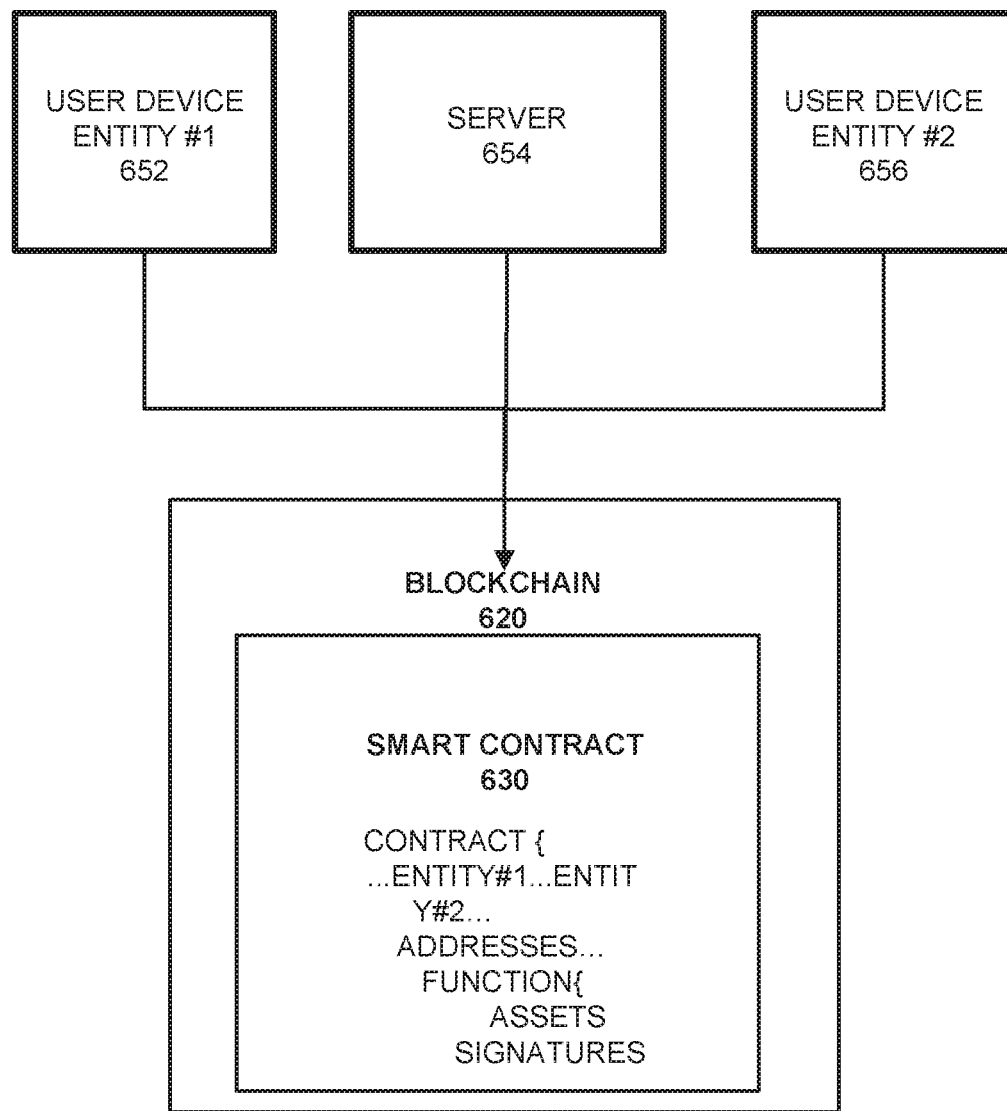
FIG. 6C illustrates a further example system configured to utilize a smart contract, according to example embodiments.

FIG. 6C illustrates an example system configured to utilize a smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
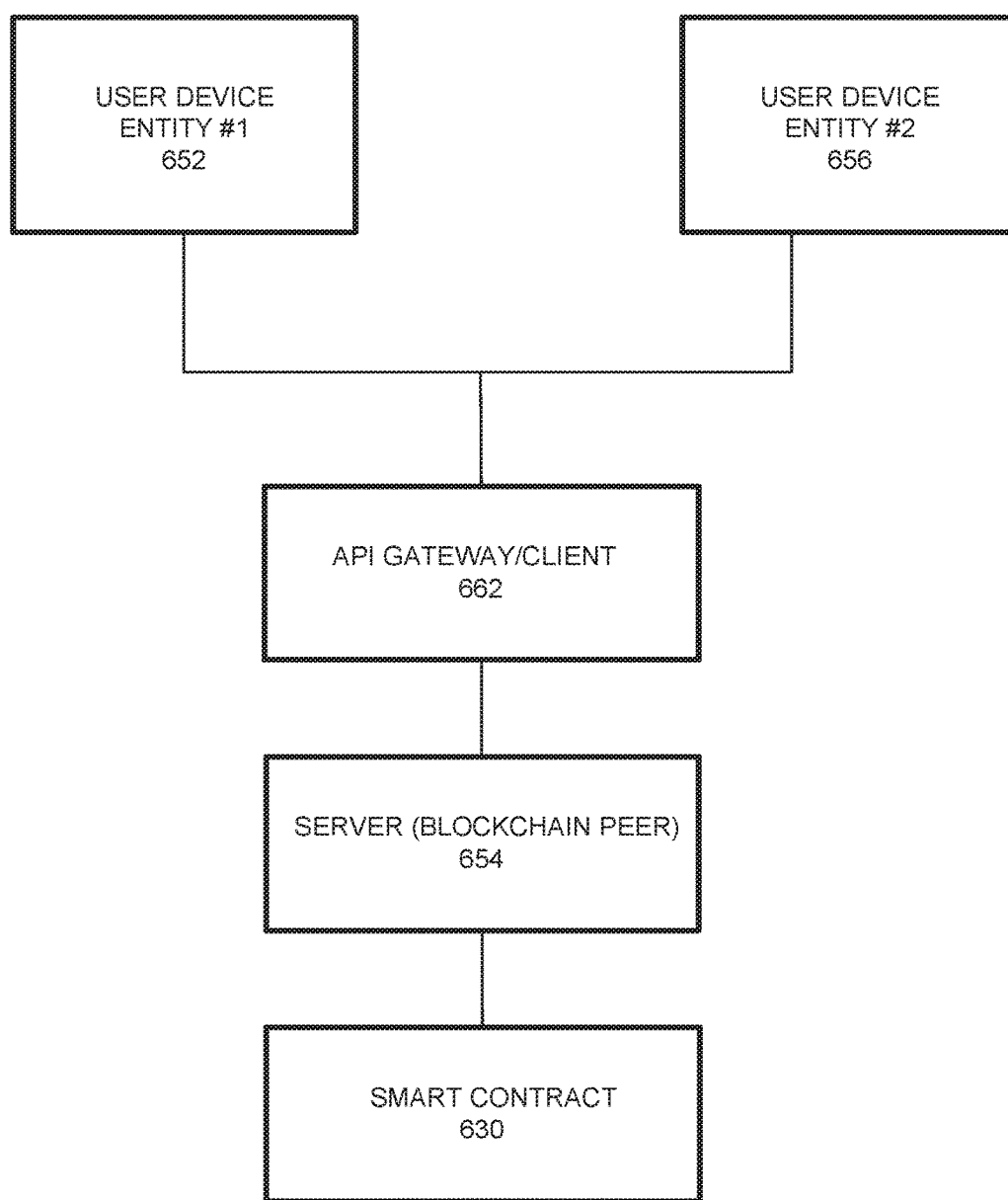
FIG. 6D illustrates yet another example system configured to utilize a blockchain, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
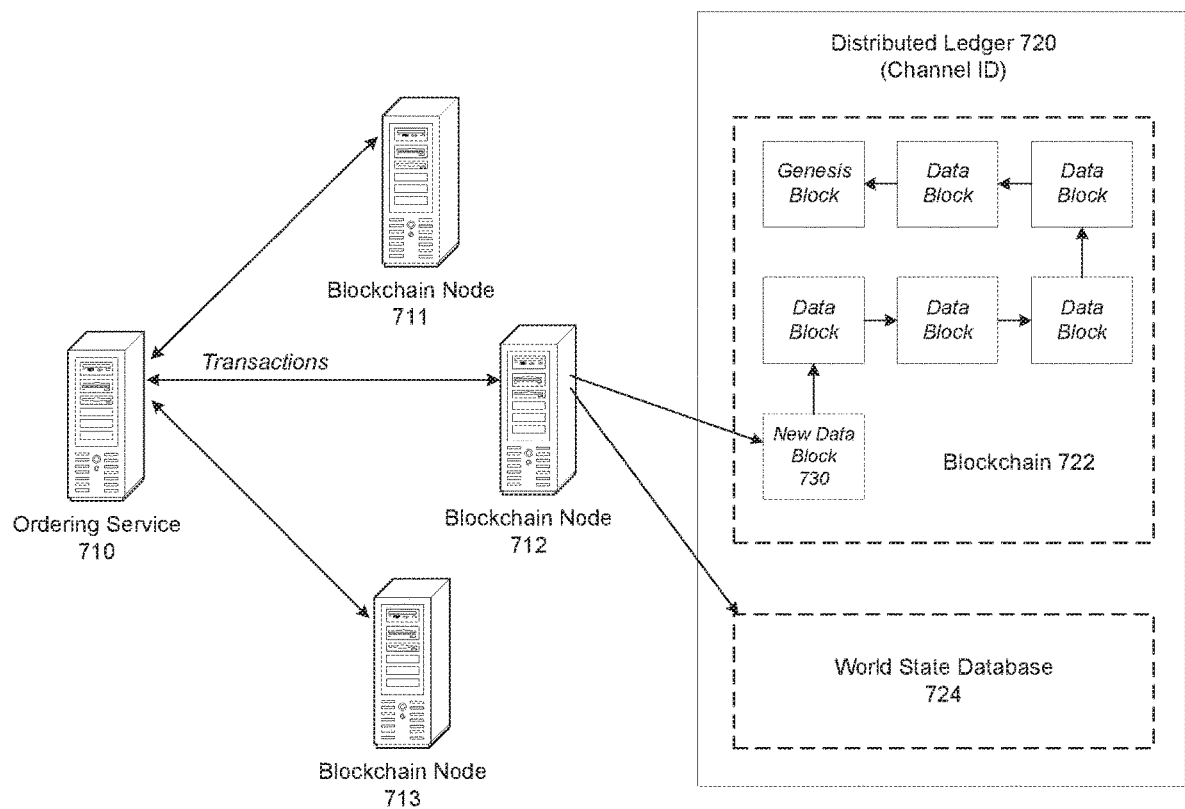
FIG. 7A illustrates a process for a new block being added to a distributed ledger, according to example embodiments.
Figure 7B:
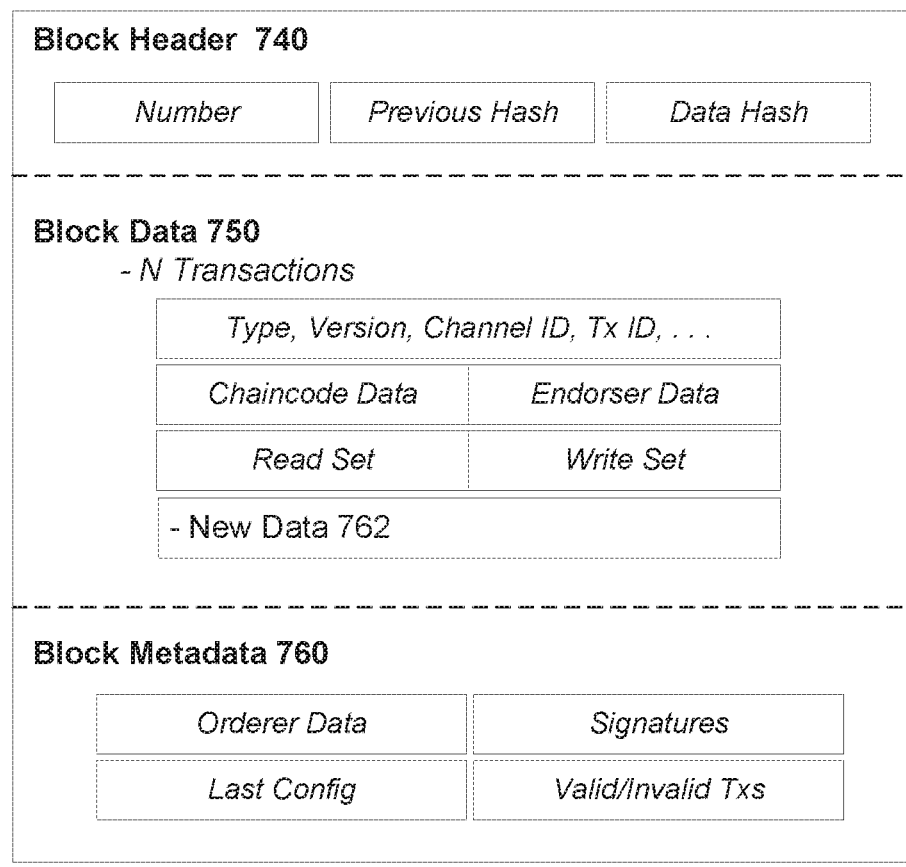
FIG. 7B illustrates contents of a new data block, according to example embodiments.

FIG. 7A illustrates a process 700 of a new block being added to a distributed ledger 720, according to example embodiments, and FIG. 7B illustrates contents of a new data block structure 730 for blockchain, according to example embodiments. Referring to FIG. 7A, clients (not shown) may submit transactions to blockchain nodes 711, 712, and/or 713. Clients may be instructions received from any source to enact activity on the blockchain 722. As an example, clients may be applications that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720. Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 720 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 722. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network.

When the ordering service 710 initializes a new data block 730, the new data block 730 may be broadcast to committing peers (e.g., blockchain nodes 711, 712, and 713). In response, each committing peer validates the transaction within the new data block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a new data block 730 (also referred to as a data block) that is stored on the blockchain 722 of the distributed ledger 720 may include multiple data segments such as a block header 740, block data 750, and block metadata 760. It should be appreciated that the various depicted blocks and their contents, such as new data block 730 and its contents, as shown in FIG. 7B, are merely examples and are not meant to limit the scope of the example embodiments. The new data block 730 may store transactional information of N transaction(s) (e.g., 1, 10, 100, 500, 1000, 2000, 3000, etc.) within the block data 750. The new data block 730 may also include a link to a previous block (e.g., on the blockchain 722 in FIG. 7A) within the block header 740. In particular, the block header 740 may include a hash of a previous block's header. The block header 740 may also include a unique block number, a hash of the block data 750 of the new data block 730, and the like. The block number of the new data block 730 may be unique and assigned in various orders, such as an incremental/sequential order starting from zero.

The block data 750 may store transactional information of each transaction that is recorded within the new data block 730. For example, the transaction data may include one or more of a type of the transaction, a version, a timestamp, a channel ID of the distributed ledger 720, a transaction ID, an epoch, a payload visibility, a chaincode path (deploy tx), a chaincode name, a chaincode version, input (chaincode and functions), a client (creator) identity such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 750 may also store new data 762 which adds additional information to the hash-linked chain of blocks in the blockchain 722. The additional information includes one or more of the steps, features, processes and/or actions described or depicted herein. Accordingly, the new data 762 can be stored in an immutable log of blocks on the distributed ledger 720. Some of the benefits of storing such new data 762 are reflected in the various embodiments disclosed and depicted herein. Although in FIG. 7B the new data 762 is depicted in the block data 750 but could also be located in the block header 740 or the block metadata 760.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions in the block data 750 and a validation code identifying whether a transaction was valid/invalid.

Figure 7C:
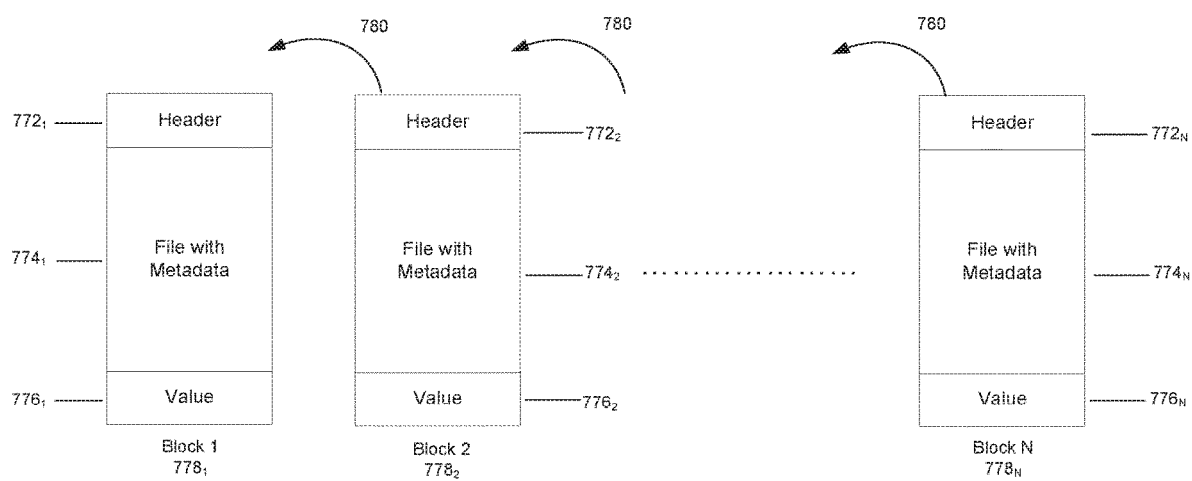
FIG. 7C illustrates a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value ... Content |
| . | . |
| . | . |
| . | . |
| Block N Hash Value | Block N Hash Value ... Content |

In the example embodiment of FIG. 7C, the blockchain 770 includes a number of blocks $778_1$, $778_2$, ... $778_N$ cryptographically linked in an ordered sequence, where N≥1. The encryption used to link the blocks $778_1$, $778_2$, ... $778_N$ may be any of a number of keyed or un-keyed Hash functions. In one embodiment, the blocks $778_1$, $778_2$, ... $778_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $778_1$, $778_2$, ..., $778_N$ may be cryptographically linked by a function that is different from a hash function. For purposes of illustration, the following description is made with reference to a hash function, e.g., SHA-2.

Each of the blocks $778_1$, $778_2$, ..., $778_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $778_1$ in the blockchain is referred to as the genesis block and includes the header $772_1$, original file $774_1$, and an initial value $776_1$. The hashing scheme used for the genesis block, and indeed in all subsequent blocks, may vary. For example, all the information in the first block $778_1$ may be hashed together and at one time, or each or a portion of the information in the first block $778_1$ may be separately hashed and then a hash of the separately hashed portions may be performed.

The header $772_1$ may include one or more initial parameters, which, for example, may include a version number, timestamp, nonce, root information, difficulty level, consensus protocol, duration, media format, source, descriptive keywords, and/or other information associated with original file $774_1$ and/or the blockchain. The header $772_1$ may be generated automatically (e.g., by blockchain network managing software) or manually by a blockchain participant. Unlike the header in other blocks $778_2$ to $778_N$ in the blockchain, the header $772_1$ in the genesis block does not reference a previous block, simply because there is no previous block.

The original file $774_1$ in the genesis block may be, for example, data as captured by a device with or without processing prior to its inclusion in the blockchain. The original file $774_1$ is received through the interface of the system from the device, media source, or node. The original file $774_1$ is associated with metadata, which, for example, may be generated by a user, the device, and/or the system processor, either manually or automatically. The metadata may be included in the first block $778_1$ in association with the original file $774_1$.

The value $776_1$ in the genesis block is an initial value generated based on one or more unique attributes of the original file $774_1$. In one embodiment, the one or more unique attributes may include the hash value for the original file $774_1$, metadata for the original file $774_1$, and other information associated with the file. In one implementation, the initial value $776_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $778_2$ to $778_N$ in the blockchain also have headers, files, and values. However, unlike the first block $772_1$, each of the headers $772_2$ to $772_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
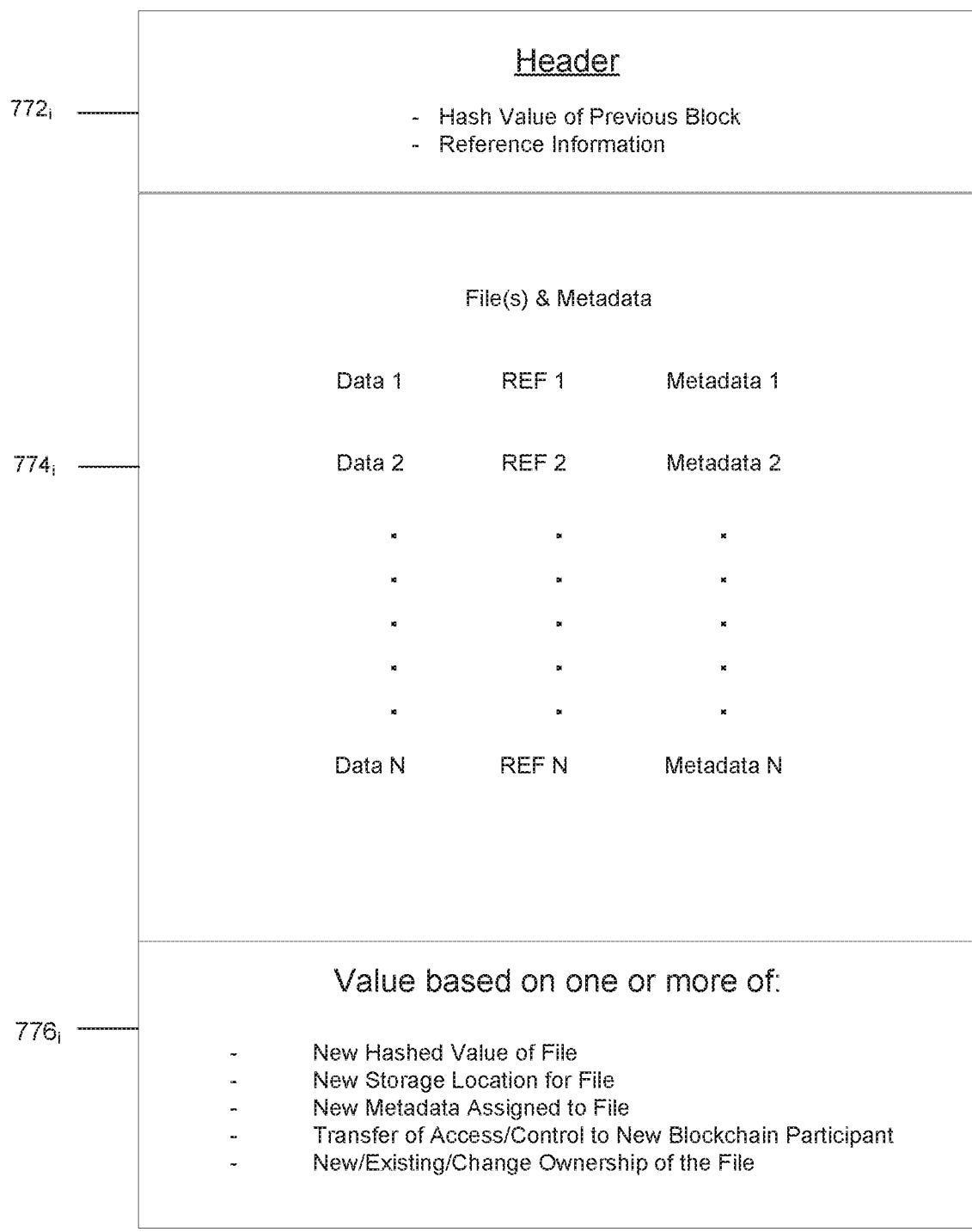
FIG. 7D illustrates a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 7D illustrates an embodiment of a block which may represent the structure of the blocks in the blockchain 790 in accordance with one embodiment. The block, $Block_i$, includes a header $772_i$, a file $774_i$, and a value $776_i$.

The header $772_i$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $774_1$ includes a plurality of data, such as Data 1, Data 2, . . . , Data N in sequence. The data are tagged with metadata Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $776_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 8:
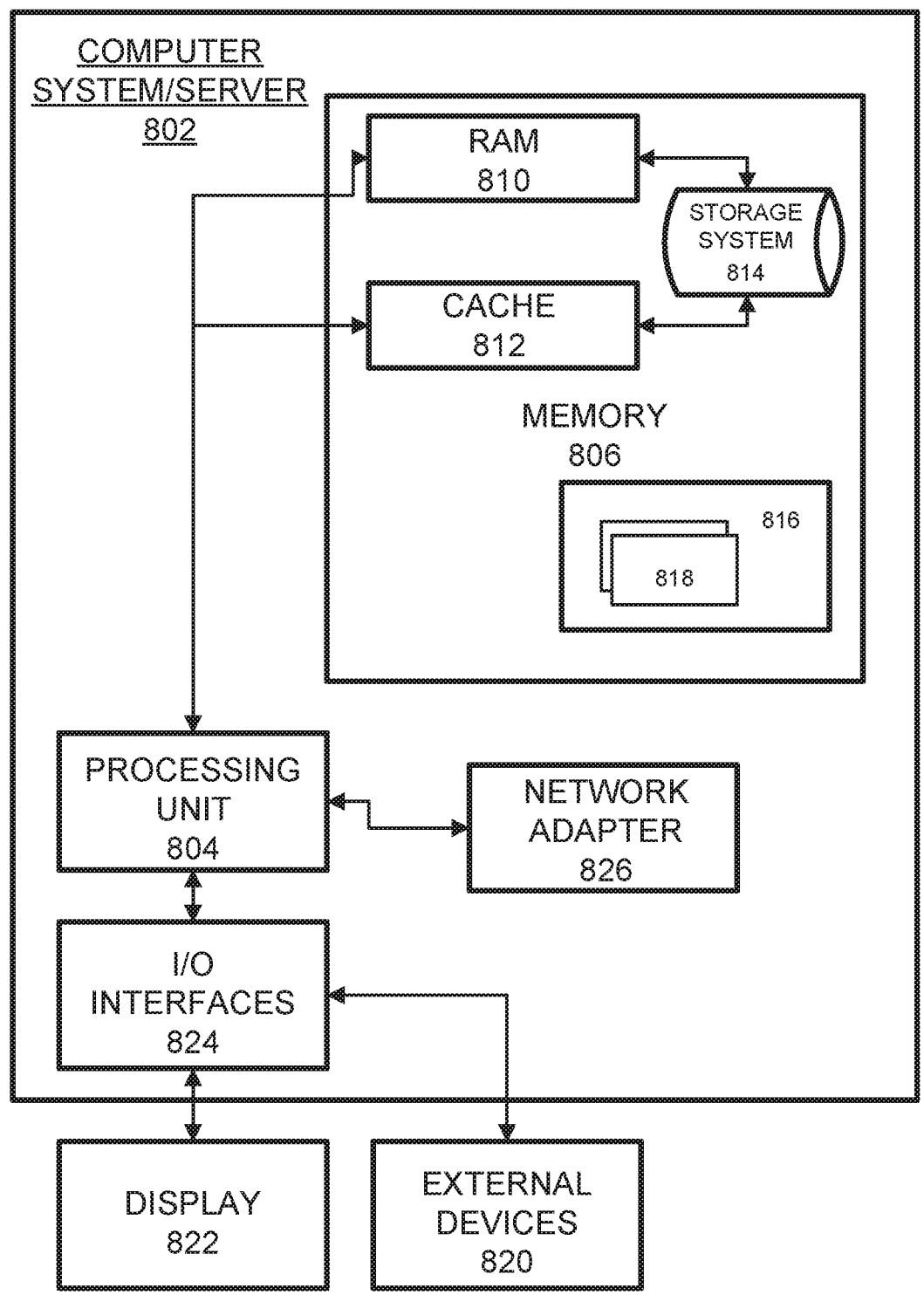
FIG. 8 illustrates an example system that supports one or more of the example embodiments.

FIG. 8 illustrates an example system 800 that supports one or more of the example embodiments described and/or depicted herein. The system 800 comprises a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A blockchain node comprising:
    a processor configured to:
        execute a blockchain consensus for a block based on an endorsement policy of a blockchain network, and commit the block to a blockchain ledger,
        read, via a blockchain smart contract, historical blockchain transaction content stored in a transaction log on the blockchain ledger,
        execute a machine learning model on the historical blockchain transactions as input to train the machine learning model to identify historical patterns of fraud,
        receive data from one or more data sources,
        predict a future fraud attempt from the received data via execution of the trained machine learning model on the received data,
        automatically modify the endorsement policy of the blockchain network based on the predicted future fraud attempt, and
        execute a blockchain consensus for a subsequently received block based on the modified endorsement policy, and commit the subsequently received block to the blockchain ledger.

2. The blockchain node of claim 1, wherein the processor is configured to:
    endorse a transaction based on the modified endorsement policy; and
    add the endorsed transaction to the transaction log.

3. The blockchain node of claim 1, wherein the endorsement policy comprises a requirement for encryption.

4. The blockchain node of claim 1, wherein the received data comprises one or more of:
    news source data, blog data, product literature, technical journal data, patent documentation, and shared ledger data.

5. The blockchain node of claim 4, wherein the processor is further configured to:
    analyze the received data; and
    modify the endorsement policy based on the analysis.

6. The blockchain node of claim 1, wherein the processor is further configured to:
    execute semantic parsing and matching algorithms.

7. The blockchain node of claim 1, wherein the processor is further configured to one or more of:
    identify a type of threat, predict a fraud scenario, identify a computing capability, and identify a computing feature.

8. A method, comprising:
    executing a blockchain consensus for a block based on an endorsement policy of a blockchain network, and committing the block to a blockchain ledger;
    reading, via a blockchain smart contract, historical blockchain transaction content stored in a transaction log on the blockchain ledger;

executing a machine learning model on the historical blockchain transactions as input to train the machine learning model to identify historical patterns of fraud;

receiving data from one or more data sources;

predicting a future fraud attempt from the received data via execution of the trained machine learning model on the received data;

automatically modifying the endorsement policy of the blockchain network based on the predicted future fraud attempt; and executing another blockchain consensus for a subsequently received block based on the modified endorsement policy, and committing the subsequently received block to the blockchain ledger.

9. The method of claim 8, further comprising:

endorsing a transaction based on the modified endorsement policy; and adding the endorsed transaction to the transaction log.

10. The method of claim 8, wherein the endorsement policy comprises a requirement for encryption.

11. The method of claim 8, wherein the received data comprises one or more of:

news source data, blog data, product literature, one or more technical journals, patent documentation, and shared ledger data.

12. The method of claim 11, wherein the modifying the endorsement policy further comprises:

analyzing the received data; and modifying the endorsement policy based on the analyzing.

13. The method of claim 8, wherein the method further comprises:

executing semantic parsing and matching algorithms.

14. The method of claim 8, wherein the predicting further comprises one or more of:

identifying a type of threat, predicting a fraud scenario, identifying a computing capability, and identifying a computing feature.

15. A non-transitory computer readable medium comprising one or more instructions that when executed by a processor of a node in a blockchain network cause the processor to perform:

executing a blockchain consensus for a block based on an endorsement policy of a blockchain network, and committing the block to a blockchain ledger;

reading, via a blockchain smart contract, historical blockchain transaction content stored in a transaction log on the blockchain ledger;

executing a machine learning model on the historical blockchain transactions as input to train the machine learning model to identify historical patterns of fraud;

predicting a future fraud attempt from the received data;

automatically modifying the endorsement policy of the blockchain network based on the predicted future fraud attempt; and executing another blockchain consensus for a subsequently received block based on the modified endorsement policy, and committing the subsequently received block to the blockchain ledger.

16. The non-transitory computer readable medium of claim 15, wherein the one or more instructions further configure the processor to perform:

endorsing a transaction based on the modified endorsement policy; and adding the endorsed transaction to the transaction log.

17. The non-transitory computer readable medium of claim 15, wherein the endorsement policy comprises a requirement for encryption.

18. The non-transitory computer readable medium of claim 15, wherein the modifying the endorsement policy further comprises:

analyzing the received data; and modifying the endorsement policy based on the analyzing.

19. The non-transitory computer readable medium of claim 15, wherein the method further comprises:

executing semantic parsing and matching algorithms.

20. The non-transitory computer readable medium of claim 15, wherein the predicting further comprises one or more of:

identifying a type of threat, predicting a fraud scenario, identifying a computing capability, and identifying a computing feature.

* * * * *